(12) United States Patent
Subramanian et al.

(10) Patent No.: US 10,444,810 B2
(45) Date of Patent: Oct. 15, 2019

(54) SYSTEM AND METHOD FOR AUTOMATIC POWER CONTROL AND UNUSUAL ACTIVITY DETECTIONS FOR THIN CLIENT COMPUTING DEVICES

(71) Applicant: American Megatrends, Inc., Norcross, GA (US)

(72) Inventors: Yugender P. Subramanian, Norcross, GA (US); David Yoon, Atlanta, GA (US); Balasubramanian Chandrasekaran, Chennai (IN); Manikandan Ganesan Malliga, Dindigul (IN)

(73) Assignee: AMZETTA TECHNOLOGIES, LLC, Norcross, GA (US)

( * ) Notice: Subject to any disclaimer, the term of this patent is extended or adjusted under 35 U.S.C. 154(b) by 85 days.

(21) Appl. No.: 15/585,694

(22) Filed: May 3, 2017

(65) Prior Publication Data
US 2018/0321724 A1   Nov. 8, 2018

(51) Int. Cl.
*G06F 1/26* (2006.01)
*G06F 1/3287* (2019.01)
*H04L 29/08* (2006.01)

(52) U.S. Cl.
CPC ............ *G06F 1/266* (2013.01); *G06F 1/3287* (2013.01); *H04L 67/18* (2013.01); *H04L 67/22* (2013.01)

(58) Field of Classification Search
None
See application file for complete search history.

(56) References Cited

U.S. PATENT DOCUMENTS

| | | | | |
|---|---|---|---|---|
| 8,024,660 | B1* | 9/2011 | Quinn | G06F 9/453 715/745 |
| 2003/0009705 | A1* | 1/2003 | Thelander | G06F 1/3203 713/340 |
| 2010/0266132 | A1* | 10/2010 | Bablani | H04L 9/0894 380/286 |
| 2011/0264931 | A1* | 10/2011 | Chang | G06F 1/3209 713/310 |
| 2014/0254769 | A1* | 9/2014 | Chicchetti | A61B 6/563 378/204 |
| 2017/0255245 | A1* | 9/2017 | Emby | G06F 1/3287 |

* cited by examiner

*Primary Examiner* — Krista M Zele
*Assistant Examiner* — Mohammad Yousuf A. Mian
(74) *Attorney, Agent, or Firm* — Locke Lord LLP; Tim Tingkang Xia, Esq.

(57) ABSTRACT

Systems and methods for automatic power control and unusual activity detections for thin client computing devices. In operation, the server receives messages from the thin clients, with each message corresponding to a activity occurred at the thin clients. The server then analyzes the messages and generates usage patterns of the thin client computing devices. Based on the usage patterns, the server may generate automatic power control schedules for the computing devices, and control power of each of the computing devices based on the automatic power control schedules. Further, the server may monitor unusual activities occurred at the computing devices based on the messages and the usage patterns of the computing devices.

18 Claims, 7 Drawing Sheets

SYSTEM AND METHOD FOR AUTOMATIC POWER CONTROL AND UNUSUAL ACTIVITY DETECTIONS FOR THIN CLIENT COMPUTING DEVICES

FIELD

The present disclosure relates generally to thin client power management technology, and more particularly to systems and methods for automatic power control and unusual activity detections for thin client computing devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A thin client device or zero client device is a computer solution whose major role is to connect a physical machine or virtual machine via remote access protocol using the operating system (OS) and other applications programmed in the hardware. A thin client device can be a small device with minimal requirement for hardware such as keyboard, mouse, monitor, universal series bus (USB) port or Ethernet card, and can therefore be particular useful for education, health care, gaming, advertisement, or other uses. Once a remote session is established to a server using a thin client device, all the user activity is processed on the remote server, which can be a physical machine or a virtual machine, and the data is stored back in the remote server. Accordingly, the thin clients devices provide high security by storing data in a centralized location if having been configured appropriately to enhance security.

However, in a client-server system with multiple thin client computing devices, management of power consumption and activity of each of the thin client computing device may be difficult, since each thin client computing device may be subject to different usage patterns from different user groups. In some cases, different activities may occur at the thin client computing devices, and it is essential to detect, among all activities of the thin client computing devices, the unusual ones that may trigger security issues.

Therefore, an unaddressed need exists in the art to address the aforementioned deficiencies and inadequacies.

SUMMARY

Certain aspects of the disclosure direct to a system, which includes: a server computing device, including a processor and a storage device storing computer executable code; and a plurality of computing devices each functioning as a thin client and communicatively connected to the server computing device and to the server computing device. In certain embodiments, the computer executable code, when executed at the processor, is configured to: receive a plurality of messages from the computing devices, where each of the messages corresponds to one of a plurality of activities occurred at the computing devices; analyze the messages and generate usage patterns of the computing devices; generate automatic power control schedules for the computing devices based on the usage patterns of the computing devices, and control power of each of the computing devices based on the automatic power control schedules; and monitor unusual activities occurred at the computing devices based on the messages and the usage patterns of the computing devices.

In certain embodiments, the activities occurred at the computing devices include: power control actions of the computing devices; log-in and log-off actions of the computing devices; active status and time of each of the computing devices; idle status and time of each of the computing devices; user presence activities at each of the computing devices; and administrator defined settings related to the computing devices.

In certain embodiments, the power control actions of the computing devices include: manual power on and power off actions operated by users at the computing devices; administrative power on and power off actions to the computing devices; and automatic power on and power off actions of each of the computing devices controlled by the computer executable code based on the automatic power control schedules.

In certain embodiments, the system further includes a plurality of motion sensors communicatively connected to the computing devices, configured to detect the user presence activities at each of the computing devices and generate corresponding motion sensor signals. In certain embodiments, the messages include the motion sensor signals generated by the motion sensors in detection of the user presence activities at each of the computing devices.

In certain embodiments, the computer executable code is configured to control power of each of the computing devices by: controlling the computing devices to power on at a predetermined power-on time; controlling the computing devices to power off at a predetermined power-off time; in response to detecting the unusual activities occurring at a specific computing device of the computing devices, locking the specific computing device; and controlling the computing devices to power on and power off at a scheduled maintenance time.

In certain embodiments, the computer executable code is configured to control the computing devices to power on by: determining, based on the usage patterns of the computing devices, a first number A of the computing devices; determining a second number N of the computing device based on the first number A and a power saving rule for optimized power saving and efficiency of the system; and controlling (A+N) of the computing devices to power on at the predetermined power-on time.

In certain embodiments, the usage patterns of the computing devices include: a plurality of individual usage patterns, each corresponding to one of the computing devices; and at least one group usage pattern corresponding to a group of the computing devices.

In certain embodiments, the group of the computing devices includes a prioritized group of the computing devices, and the computer executable code is configured to control power of each of the computing devices by: controlling the computing devices in the prioritized group to power on at a prioritized power-on time and power off at a prioritized power-off time; and controlling the computing devices not in the prioritized group to power on at a regular power-on time and power off at a regular power-off time; wherein the prioritized power-on time is prior to the regular power-on time, and the prioritized power-off time is later than the regular power-off time.

In certain embodiments, the computing devices in the prioritized group are determined by: the usage patterns of the computing devices; and locations of the computing devices.

In certain embodiments, the computer executable code is configured to monitor the unusual activities occurred at the computing devices by: receiving a message from a designated computing device of the computing devices; comparing the message with the usage pattern of the designated computing device to determine whether an activity corresponding to the message is within the usage pattern of the designated computing device; and in response to determining that the activity corresponding to the message is not within the usage pattern of the designated computing device, determining a unusual activity to occur at the designated computing device.

In certain embodiments, the computer executable code is further configured to: generate an event log based on the messages received from the computing devices.

Certain aspects of the disclosure direct to a method for automatic power control and unusual activity detections for thin client computing devices, including: receiving, by a server computing device, a plurality of messages from a plurality of computing devices, wherein each of the computing devices functions as a thin client, and each of the messages corresponds to one of a plurality of activities occurred at the computing devices; analyzing, by the server computing device, the messages and generating usage patterns of the computing devices; generating, by the server computing device, automatic power control schedules for the computing devices based on the usage patterns of the computing devices, and controlling power of each of the computing devices based on the automatic power control schedules; and monitoring, by the server computing device, unusual activities occurred at the computing devices based on the messages and the usage patterns of the computing devices.

In certain embodiments, the method further includes: detecting, by a plurality of motion sensors the user presence activities at each of the computing devices and generating corresponding motion sensor signals, where the messages received by the server computing device comprise the motion sensor signals generated by the motion sensors in detection of the user presence activities at each of the computing devices.

Certain aspects of the disclosure direct to a non-transitory computer readable medium storing computer executable code. The computer executable code, when executed at a processor of a server computing device of a client-server system, is configured to: receive a plurality of messages from a plurality of computing devices, wherein each of the computing devices functions as a thin client, and each of the messages corresponds to one of a plurality of activities occurred at the computing devices; analyze the messages and generate usage patterns of the computing devices; generate automatic power control schedules for the computing devices based on the usage patterns of the computing devices, and control power of each of the computing devices based on the automatic power control schedules; and monitor unusual activities occurred at the computing devices based on the messages and the usage patterns of the computing devices.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

Certain embodiments of the present disclosure relate to computer technology. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

In certain aspects, the present disclosure provides a solution for automatic power control and unusual activity detection of thin client computing devices by a server. In particular, by tracking the usage patterns of the thin clients, the server may determine the ideal balance between (1) leaving the thin clients turned on and running idle (i.e., wasting power) and (2) keeping the thin clients turned off to save power, but the users may waste more time before being able to utilize the thin clients. In this way, it is possible to both satisfy a majority of the end users and also maximize power savings of the client-server system. Further, the system may more easily take notice of unusual activities based on the usage patterns of the thin client computing devices and alert the administrator to potential security threats.

In certain embodiments, by keeping track of individual thin client usage, it is possible to accomplish basic thin client automatic power savings without the need for a manager. Further, in certain embodiments, when the usage patterns show that users may have a preference tendency over certain thin client computing devices, the system may control these "popular" seats of the thin client computing devices to turn on first and turn off last. In certain embodiments, the system may control the power of the thin client computing devices by distributing the seats as sparsely as possible such that the users may feel most comfortable.

Figure 1:
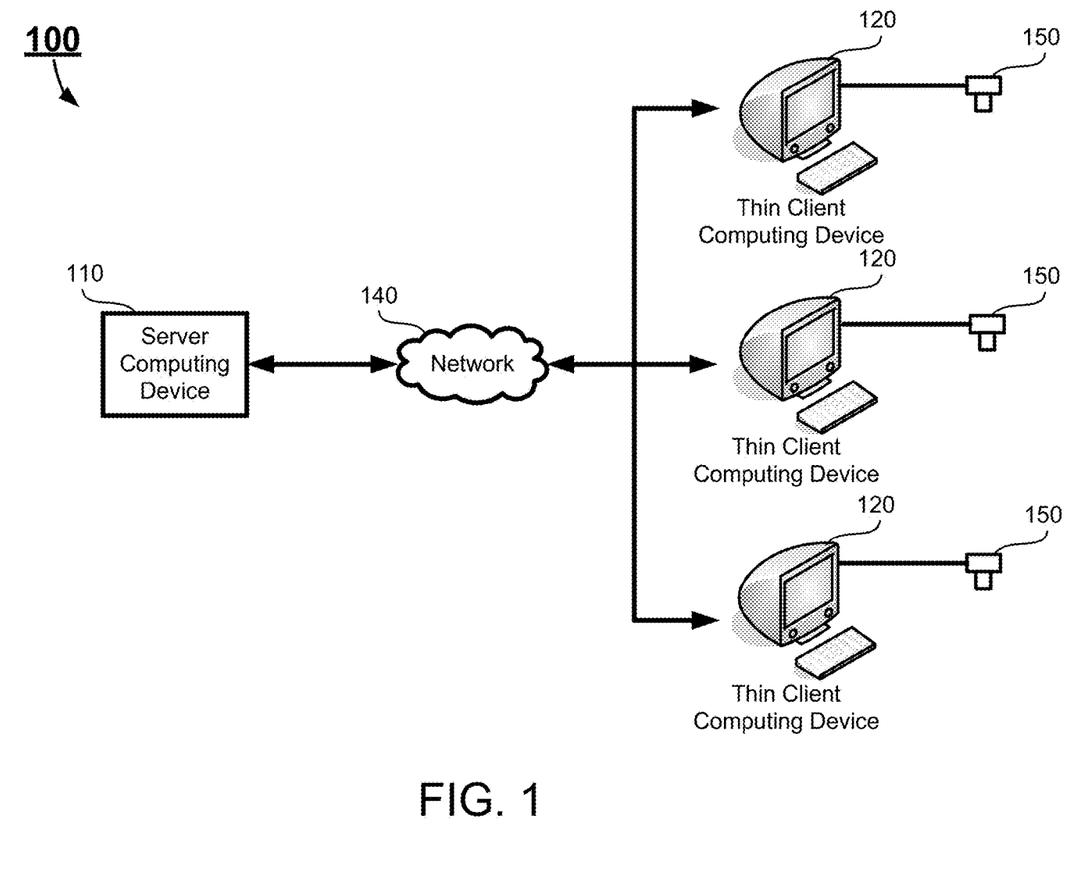
FIG. 1 schematically depicts a system according to certain embodiments of the present disclosure.

FIG. 1 schematically depicts a system according to certain embodiments of the present disclosure. In certain embodiments, the system 100 has a client-server structure. As shown in FIG. 1, the system 100 includes a server computing device 110 and a plurality of computing devices 120 communicatively connected to the server computing device 110 via a network 140. Further, a plurality of motion sensors 150 may be provided and communicatively connected to the computing devices 120. In certain embodiments, the network 140 may be a wired or wireless network, and may be of various forms. Examples of the network 140 may include, but is not limited to, a local area network (LAN), a wide area network (WAN) including the Internet, or any other type of networks.

The server computing device 110 is a computing device functioning as a server of the system 100. In certain embodiments, the server computing device 110 may be a provider of resources or services for the computing devices 120, i.e., the clients of the system 100. For example, the system may be a virtual desktop infrastructure (VDI) system, and the server computing device 110 may be a VDI server, which provides a plurality of virtual machines (VM) for the thin clients (i.e., the computing devices 120), such that all users are accessing or connecting to the VMs from the computing devices 120. The server computing device 110 provides most of the resources of the system 100, which will be shared to all of the VMs accessed by the users from the computing device 120. In certain embodiments, the system 100 may include more than one server computing device 110, which functions as one or more servers. In certain embodiments, a server may be implemented by one single server computing device 110, or by multiple server computing devices 110.

The computing devices 120 are devices functioning as the thin clients of the system 100. In certain embodiments, each of the computing devices 120, as a thin client, may be a lightweight computer with minimal requirement for hardware, whose user activity is processed on the VM provided by the server computing device 110. In certain embodiments, each of the computing devices 120 may be identical to one another.

The motion sensors 150 are sensors that may be used to detect motions. In certain embodiments, the motion sensors 150 are provided such that for each of the computing devices 120, a corresponding motion sensor 150 may be used to detect user presence at the computing device 120. When a user is present at the computing device 120, the user's motion may trigger the motion sensor 150 to generate corresponding motion sensor signals, which may be used by the server computing device 110 in the power control analysis and monitoring process.

Figure 2:
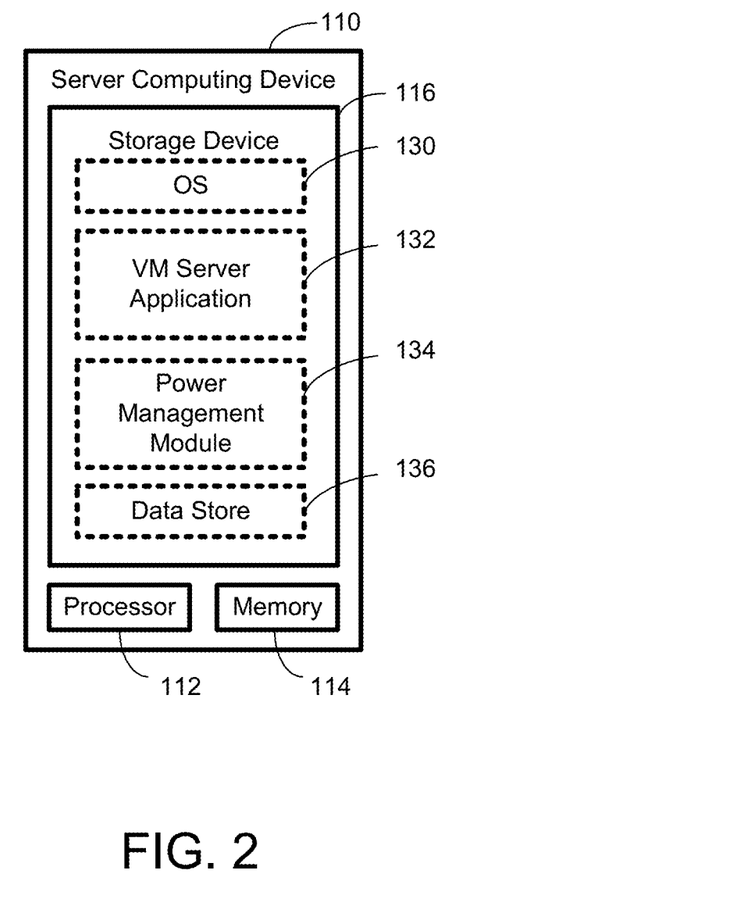
FIG. 2 schematically depicts a server computing device of the system according to certain embodiments of the present disclosure.

FIG. 2 schematically depicts a server computing device of the system according to certain embodiments of the present disclosure. As shown in FIG. 2, the server computing device 110 includes a processor 112, a memory 114, and a storage device 116. Further, the server computing device 110 may include other hardware components and software components (not shown) to perform its corresponding tasks. For example, the server computing device 110 may include, but not limited to, other required memory, interfaces, buses, Input/Output (I/O) modules, network interface cards (NICs) and peripheral devices.

The processor 112 is configured to control operation of the server computing device 110. In certain embodiments, the processor 112 may be a central processing unit (CPU). The processor 112 can execute any computer executable code or instructions, such as the OS 130, the management server application 132, the power control/monitor module 134, and/or other applications and instructions of the server computing device 110. In certain embodiments, the server computing device 110 may run on more than one processor, such as two processors, four processors, eight processors, or any suitable number of processors.

The memory 114 can be a volatile memory, such as the random-access memory (RAM), for storing the data and information during the operation of the server computing device 110. In certain embodiments, the memory 114 may be a volatile memory array. In certain embodiments, the server computing device 110 may run on more than one memory 114.

The storage device 116 is a local non-volatile data storage media for storing the computer executable code or instructions and other necessary data of the server computing device 110. In certain embodiments, the computer executable code or instructions of the server computing device 110 may be implemented as one or more application programs or modules. Examples of the storage device 116 may include non-volatile memory such as flash memory, memory cards, hard drives, floppy disks, optical drives, or any other types of data storage devices. In certain embodiments, the server computing device 110 may have multiple storage devices 116, which may be identical storage devices or different types of storage devices, and the computer executable code or instructions of the server computing device 110 may be stored in one or more of the storage devices 116 of the server computing device 110.

As shown in FIG. 2, the computer executable code and applications stored in the storage device may include an operating system (OS) 130, a VM server application 132, a power management module 134, and a data store 136.

The OS 130 includes a set of functional programs that control and manage operations of the server computing device 110. In certain embodiments, the OS 130 may receive and manage the simulated signals from components of the server computing device 110. The OS 130 may not realize that it is running on virtual machine and may perceive that it is running on a physical machine. In certain embodiments, the OS 130 is operable to multitask, i.e., execute computing tasks in multiple threads. In certain embodiments, the OS 130 may be any of the following: MICROSOFT CORPORATION's "WINDOWS 95," "WINDOWS CE," "WINDOWS 98," "WINDOWS 2000," "WINDOWS NT," "WINDOWS Vista," "WINDOWS 7," "WINDOWS 8," "WINDOWS 10" operating systems, IBM's OS/2 WARP, APPLE's MACINTOSH OSX operating system, LINUX, UNIX, or any other operating systems.

The VM server application 132 is a software application to provide the VM 145 for the computing device 120 (i.e., the thin client or the zero client). For example, the system 100 may be a VDI system, and the VM server application 132 may be a VDI server program, which provides a plurality of VMs for multiple thin clients or zero clients (i.e., the computing devices 120), such that all users may access or connect to the VMs from the computing devices 120. In certain embodiments, the VM server application 132 may control and distribute most of the resources of the system 100, which will be shared to all of the VMs accessed by the users from the computing device 120.

The power management module 134 is a computer program to control and manage the power usage of the computing devices 120 (i.e., the thin client or the zero client) and monitor the activities of the computing devices 120. In particular, the goals of the power management module 134 include, without being limited thereto, maintaining efficient power usage of the system 100, maintaining security and simplified management of the system 100, and improving user satisfaction and preference by optimizing the power-on computing devices 120 available for the users. For example, to maintain efficient power usage of the system 100, the power management module 134 may monitor the activities of the computing devices 120, and perform analysis of the activities, such that the power management module 134 may keep only the minimum number of the thin client computing devices 120 powered on, and to keep the thin client computing devices 120 powered on for a minimum amount of time.

Figure 3:
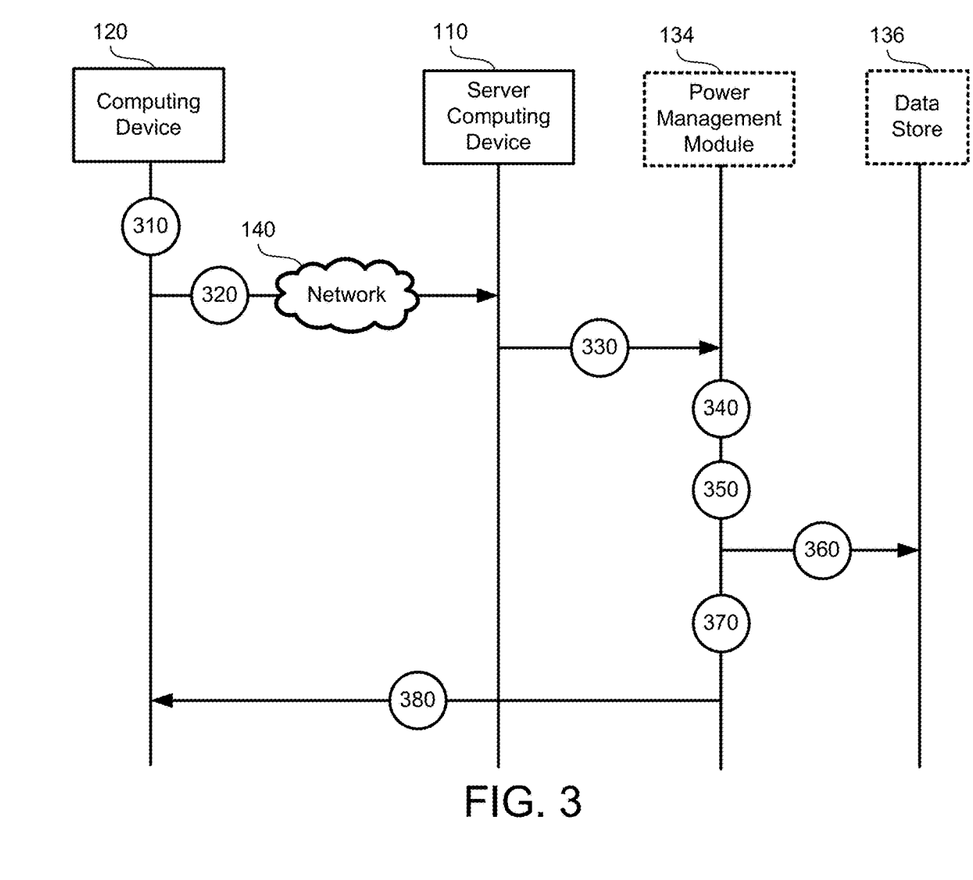
FIG. 3 schematically depicts the operation of the power management module according to certain embodiments of the present disclosure.

FIG. 3 schematically depicts the operation of the power management module according to certain embodiments of the present disclosure. It should be particularly noted that, unless otherwise stated in the present disclosure, the steps of the operation may be arranged in a different sequential order, and are thus not limited to the sequential order as shown in FIG. 3.

In certain embodiments, the power management module 134 may be configured to receive a plurality of messages from the computing devices 120, where each of the messages corresponds to one of a plurality of activities occurred at the computing devices 120. As shown in FIG. 3, at procedure 310, an activity occurs at a computing device 120, and the computing device 120 generates a corresponding message to the activity. At procedure 320, the computing device 120 sends the message to the server computing device 110 via the network 140. Upon receiving the message, at procedure 330, the server computing device 110 calls the power management module 134 to process the message.

In response to the messages, at procedure 340, the power management module 134 may process the message to generate an event log based on the messages received from the computing devices 120. In addition, the power management module 134 may analyze the messages based on predetermined rules and algorithms, and generate usage patterns of the computing devices 120 according to the analysis of the messages. Once the usage patterns of the computing devices 120 are obtained, at procedure 350, the power management module 134 may also generate automatic power control schedules for the computing devices 120 based on the usage patterns of the computing devices 120, such that the power management module 134 may control power of each of the computing devices 120 based on the automatic power control schedules. For example, in certain embodiments, the automatic power control schedules may include a predetermined power-on time and a predetermined power-off time, such that the power management module 134 may control power of each of the computing devices 120 by controlling the computing devices 120 to power on at the predetermined power-on time, and to power off at the predetermined power-off time. In certain embodiments, at procedure 360, the power management module 134 may store the event log, the usage patterns and the automatic power control schedules of the computing devices 120 in the data store 136 for further analysis and monitor purposes. Moreover, during the analysis of the messages, the power management module 134 may monitor unusual activities occurred at the computing devices 120 based on the messages and the usage patterns of the computing devices 120. When one of the messages received from the computing devices 120 indicates an unusual activity, at procedure 370, the power management module 134 may determine a corresponding action, such as locking the specific computing device 120 where the unusual activity occurs. At procedure 380, the power management module 134 may perform the corresponding action (e.g., locking the computing device 120).

The data store 136 is a database which stores the information corresponding to the activities of the computing device 120 and the analysis result, and other necessary data for the server computing device 110. In certain embodiments, the data stored in the data store 136 may include, without being limited to, the event log generated by the power management module 134; the predetermined rules and algorithm being used to analyze the messages; the usage patterns of the computing devices 120; and the automatic power control schedules of the computing devices 120. It should be noted that, although the data store 136 is illustrated in FIG. 2 as a single block, the actual data stored in the data store 136 may be distributed in different locations of the storage device 116. In certain embodiments, when the server computing device 110 includes multiple storage devices 116, the actual data stored in the data store 136 may be distributed among the multiple storage devices 116.

In certain embodiments, the messages received from the computing device 120 may be related to activities occurred at the computing devices 120 about power control actions, such as a power on action or a power off action. For example, for a specific computing device 120, the power control actions may include, without being limited to, manual power on and power off actions operated by users at the computing device 120, or administrative power on and power off actions issued by an administrator of the system 100 (either at the computing device 120 or from a remote location) to the computing device 120. In certain embodiments, the power control actions may further include the automatic power on and power off actions of the computing device 120 controlled by the power management module 134 based on the automatic power control schedules. Since the automatic power on and power off actions of the computing device 120 are controlled by the power management module 134 and are sent back to the power management module 134 as the activities occurred at the computing devices 120 to be analyzed, the analysis of the power management module 134 may create a feedback power control loop.

As discussed above, the power management module 134 may control power of each of the computing devices 120 by controlling the computing devices 120 to power on at the predetermined power-on time, and to power off at the predetermined power-off time. In certain embodiments, in addition to the regular power on and power off control based on the automatic power control schedules, the power management module 134 may control the computing devices to power on and power off at a scheduled maintenance time.

In certain embodiments, the messages received from the computing device 120 may be related to user activities, such as log-in and log-off actions of the computing devices 120, active status and time of each of the computing devices 120, and/or idle status and time of each of the computing devices 120.

In certain embodiments, the messages received from the computing device 120 may be related to user presence activities at each of the computing devices 120. For example, for a specific computing device 120, the corresponding motion sensor 150 may detect user presence activities when a user chooses to sit at the computing device 120. In this case, the motion sensor 150 may generate corresponding motion sensor signals to the user's motions. The computing device 120 may then send the motion sensor signals generated by the motion sensor 150 as the messages to the server computing device 120, such that the power management module 134 may determine, based on the motion sensor signals, that a user is present at the computing device 120.

Figure 4:
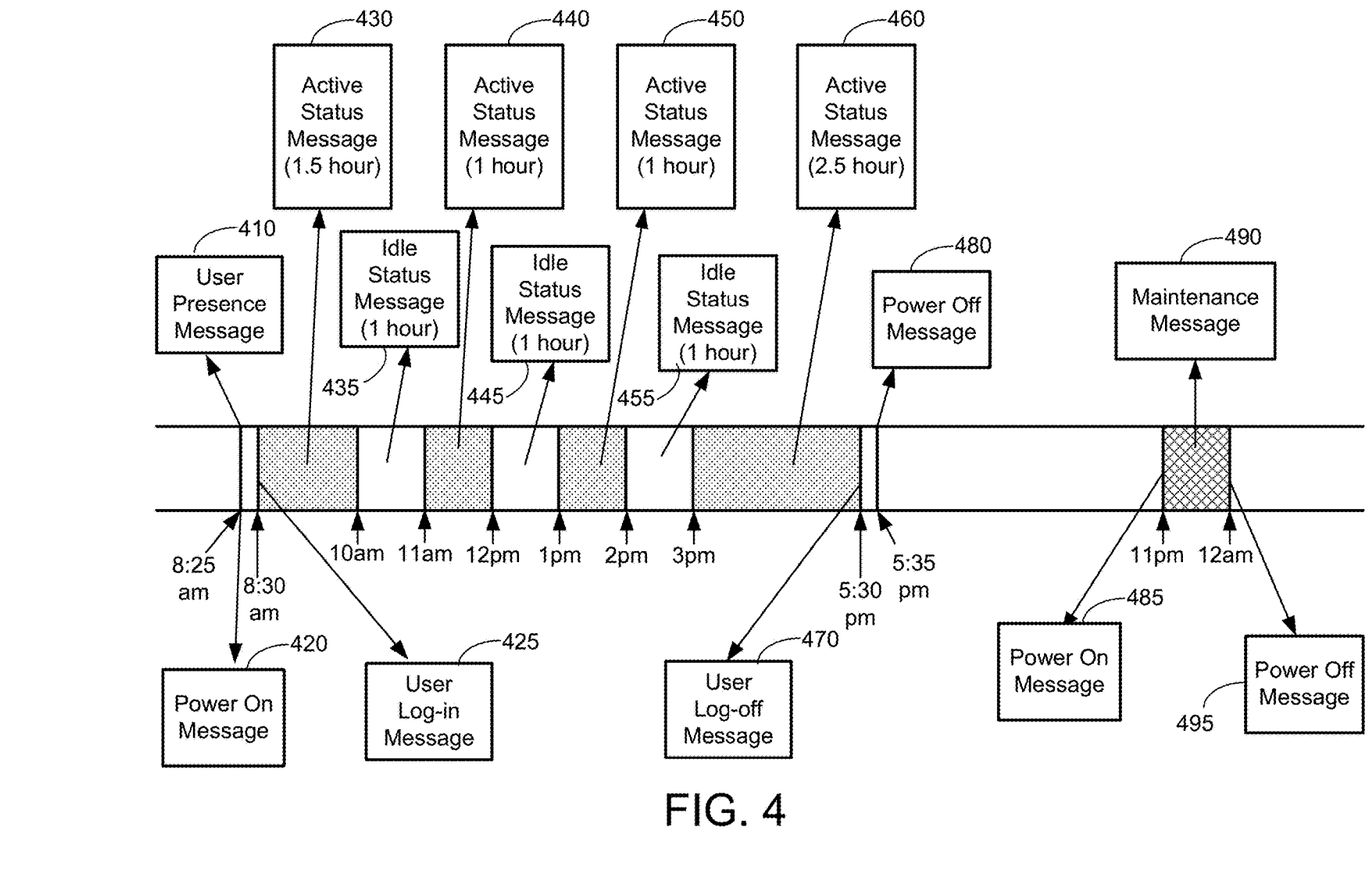
FIG. 4 schematically depicts an example of messages generated by a thin client computing device of the system according to certain embodiments of the present disclosure.

In certain embodiments, the activities related to power control actions and user activities may be described in detail using an example of the messages generated by a computing device 120. FIG. 4 schematically depicts an example of messages generated by a thin client computing device of the system according to certain embodiments of the present disclosure. In the example as shown in FIG. 4, the computing device 120 belongs to a client-server system in an office environment, in which an employee of the office is the user of the thin client computing device 120.

As shown in FIG. 4, the employee may arrive in the office at around 8:25 a.m. in the morning. In this case, when the employee appears at the location near the computing device 120, the corresponding motion sensor 150 may be triggered by the employee's motions and detect user presence activities, thus generating a user presence message 410. Then, the employee turns on the computing device 120, which generates a power on message 420. At 8:30 a.m., the computing device 120 finishes booting and is ready for operation, and the employee may input the log-in credentials to the computing device 120, which generates a user log-in message 425.

Once the employee logs in with the computing device 120, the employee may start the regular daily work, which involves multiple periods of time using and not using the computing device 120. For example, the employee may use the computing device 120 between 8:30-10 a.m. (which makes the computing device 120 generate an active status message 430 of 1.5 hours), then leave the computing device 120 to participate in a meeting (which makes the computing device 120 generate an idle status message 435 of 1 hour), and come back to do some more work between 11 a.m.-12 p.m. (which makes the computing device 120 generate an active status message 440 of 1 hour), before leaving the office for lunch between 12-1 p.m. (which makes the computing device 120 generate an idle status message 445 of 1 hour).

When the employee comes back from lunch at 1 p.m., the employee may do some work using the computing device 120 between 1-2 p.m. (which makes the computing device 120 generate an active status message 450 of 1 hour), participate in another meeting between 2-3 p.m. (which makes the computing device 120 generate an idle status message 455 of 1 hour), and then do some more work using the computing device 120 (which makes the computing device 120 generate an active status message 460 of 2.5 hours), before logging off at 5:30 p.m. (which makes the computing device 120 generate a user log-off message 470). At 5:35 p.m., the employee turns off the computing device 120, which generates a power off message 480. The computing device 120 remains off until 11 p.m., when a scheduled maintenance requires the computing device 120 to be powered on, thus generating a power on message 485. Then the maintenance process is performed, which generates a maintenance message 490. At 12 a.m., the maintenance is complete, and the computing device 120 is powered off, thus generating a power off message 495.

As shown in FIG. 4, when the computing device 120 generates each of these messages, the computing device 120 sends the messages to the server computing device 110, such that the power management module 134 may analyze the messages based on predetermined rules and algorithms, and generate usage patterns of the computing device 120 according to the analysis of the messages. For example, the power management module 134 may collect the messages from a specific computing device 120 for 10 consecutive work days, and determine from the messages that the employee generally arrives at the office around 8:15-8:30 a.m. and logs off the computing device 120 around 5:25-5:40 p.m. In this case, a usage pattern of the specific computing device 120 may be created, in which the computing device 120 is generally required to be on between 8:15 a.m. and 5:40 p.m. Thus, the power management module 134 may generate an automatic power control schedules to automatically power-on the specific computing device 120 at 8:15 a.m., and power-off the specific computing device 120 at 5:40 p.m., based on the usage patterns of the computing device 120.

As discussed above, when the power management module 134 receives the messages from the computing devices 120, the power management module 134 may analyze the messages based on predetermined rules and algorithms, and generate the usage patterns of the computing devices 120 according to the analysis of the messages. In certain embodiments, for a specific computing device 120, the usage patterns of the computing device 120 may include an individual usage pattern corresponding to specific computing device 120. In other words, for each of the computing devices 120, a plurality of individual usage patterns for each of the computing devices 120 may be generated. In certain embodiments, for some or all of the computing devices 120, the power management module 134 may analyze the computing devices 120 as a group to generate at least one group usage pattern corresponding to the group of the computing devices 120.

In certain embodiments, when the power management module 134 controls the computing devices 120 to power on, the power management module 134 may follow certain rules for a balance between power saving purposes and efficiency of the system 100. For example. the power management module 134 may determine, based on the usage patterns of a group of the computing devices 120, a first number A of the computing devices 120, where the first number represents a regular number of the computing devices 120 that are typically used at a certain time period. In addition to these computing devices 120, the power management module 134 may further determine a second number N of the computing device based on the first number A and a power saving rule for optimized power saving and efficiency of the system. Since any additional computing device 120 being turned on would consume power, the second number N should be a minimum number of additional seats of the computing devices 120 required for the maximum efficiency of the system 100. Once the values of the numbers A and N are determined, the power management module 134 may control (A+N) of the computing devices to power on at the predetermined power-on time.

In certain embodiments, the group of the computing devices 120 may be determined based on a priority level of each of the computing devices 120. For example, in certain embodiments, users may prefer using one or more of the computing devices 120 based on the locations of the computing devices 120, which may be observable in the usage patterns. In this case, the priority levels of the computing devices 120 may be determined by the usage patterns of the computing devices 120 and the locations of the computing devices 120, and the power management module 134 may control power of each of the computing devices 120 based on such priority levels.

Figure 5:
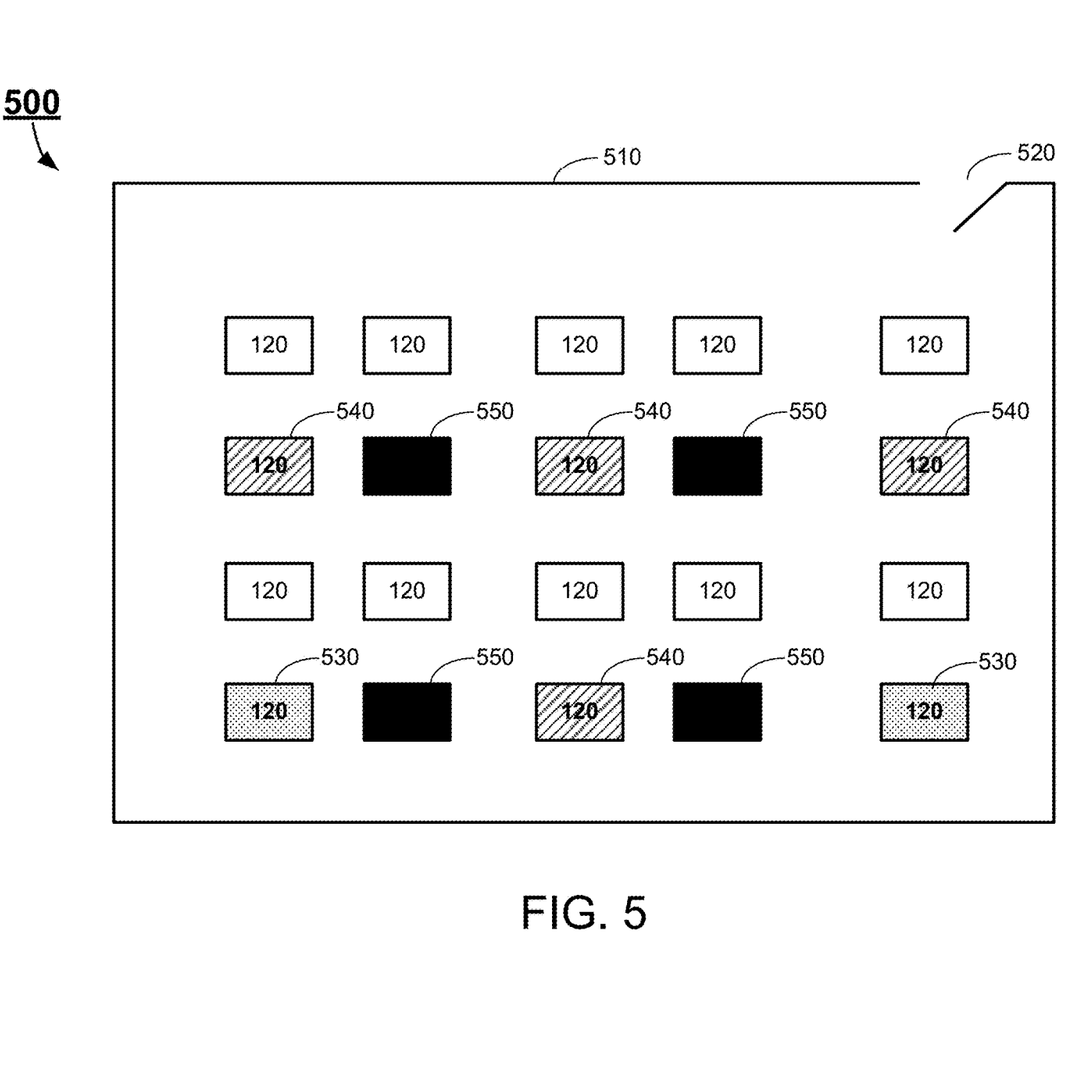
FIG. 5 schematically depicts a seat distribution of multiple thin client computing devices according to certain embodiments of the present disclosure.

FIG. 5 schematically depicts a seat distribution of multiple thin client computing devices according to certain embodiments of the present disclosure. As shown in FIG. 5, a plurality of computing devices 120 may be located in a room 510. In certain embodiments, among the computing devices 120 in the room 510, the two computing devices 120 at the two lower corners may be the "popular" seats 530 because they are away from the entrance 520 of the room 510, and are more distanced from other computing devices 120. Further, the room 510 may include some columns 550 that divide some of the seats, and the usage patterns of the computing devices 120 may indicate that certain computing devices 120 may be the "user friendly" seats 540, because they are located near the columns 550 and thus not located right next to another computing device 120. In this case, the "popular" seats 530 and the "user friendly" seats 540 may be designated with a higher priority level, thus constituting a prioritized group of computing devices.

Figure 6:
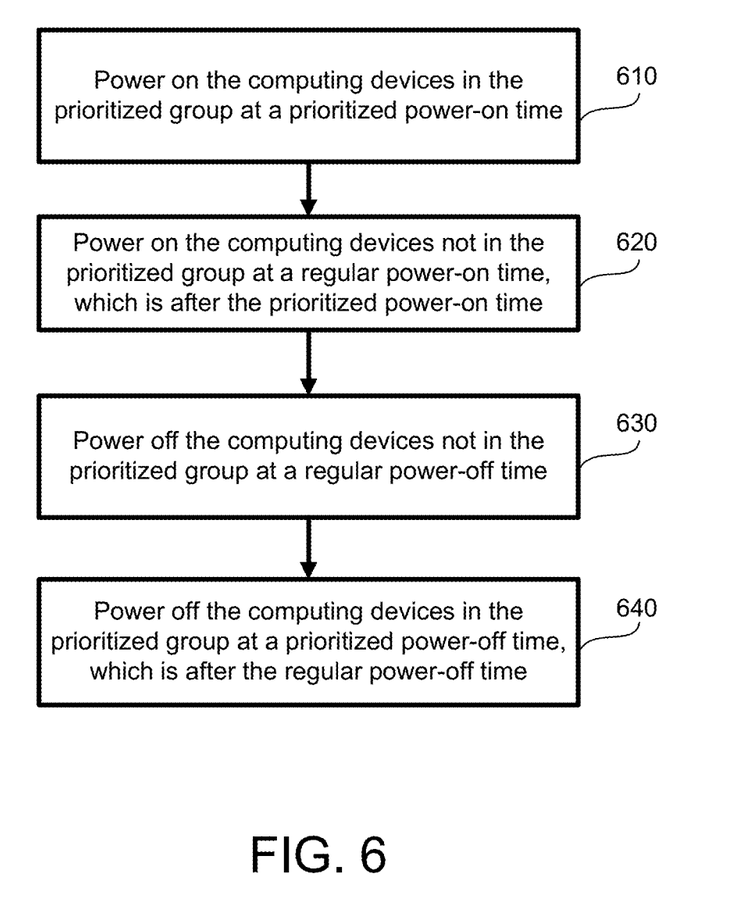
FIG. 6 depicts a flowchart of power control to the thin client computing devices according to certain embodiments of the present disclosure.

In certain embodiments, for the purpose of efficient seat distribution, the power management module 134 may control power of each of the computing devices 120 by giving priority to the computing devices in the prioritized group (i.e., the "popular" seats 530 and the "user friendly" seats 540). For example, FIG. 6 depicts a flowchart of power control to the thin client computing devices according to certain embodiments of the present disclosure. In certain embodiments, the method of power control to the thin client computing devices may be implemented by a system as shown in FIGS. 1 and 2, and the thin client computing devices may be distributed in a seat distribution as shown in FIG. 5. It should be particularly noted that, unless otherwise stated in the present disclosure, the steps of the method may be arranged in a different sequential order, and are thus not limited to the sequential order as shown in FIG. 6.

As shown in FIG. 6, when the power management module 134 controls the computing devices 120 to power on, at procedure 610, the power management module 134 may control the computing devices 120 in the prioritized group (i.e., the "popular" seats 530 and the "user friendly" seats 540) to power on at a prioritized power-on time. Then, at procedure 620, the power management module 134 may control the computing devices 120 not in the prioritized group to power on at a regular power-on time, which is after the prioritized power-on time. On the other hand, when the power management module 134 controls the computing devices 120 to power off, at procedure 630, the power management module 134 may control the computing devices 120 not in the prioritized group to power off at a regular power-off time. Then, at procedure 640, the power management module 134 may control the computing devices 120 in the prioritized group (i.e., the "popular" seats 530 and the "user friendly" seats 540) to power off at a prioritized power-off time, which is after the regular power-off time. In other words, the prioritized power-on time for the computing devices 120 in the prioritized group (i.e., the "popular" seats 530 and the "user friendly" seats 540) is prior to the regular power-on time, and the prioritized power-off time for the computing devices 120 in the prioritized group (i.e., the "popular" seats 530 and the "user friendly" seats 540) is later than the regular power-off time.

In certain embodiments, the messages received from the computing device 120 may be related to administrator defined settings related to the computing devices 120. In particular, an administrator of the system 100 may define any settings of the computing devices 120 that may override the actual activities at the computing devices 120.

Figure 7:
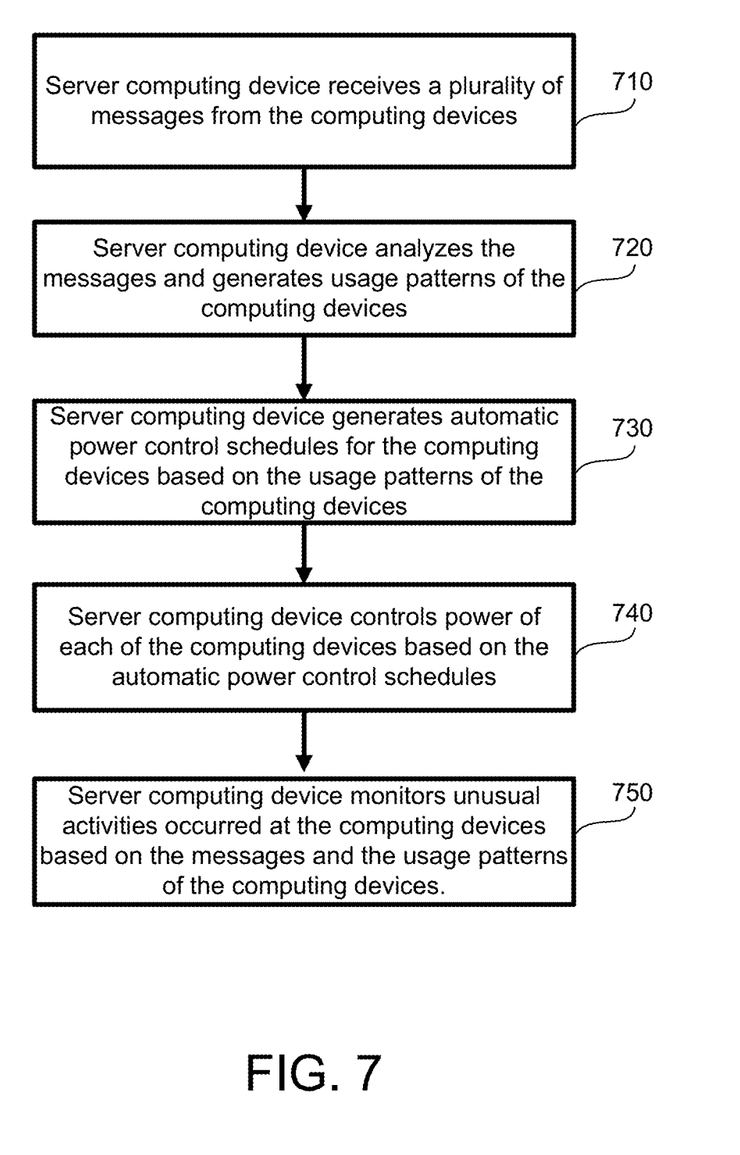
FIG. 7 depicts a flowchart of a method for automatic power control and unusual activity detections for thin client computing devices according to certain embodiments of the present disclosure.

FIG. 7 depicts a flowchart of a method for automatic power control and unusual activity detections for thin client computing devices according to certain embodiments of the present disclosure. In certain embodiments, the methods for automatic power control and unusual activity detections for thin client computing devices may be implemented by a system 100 as shown in FIG. 1 and the server computing device 110 as shown in FIG. 2. It should be particularly noted that, unless otherwise stated in the present disclosure, the steps of the method may be arranged in a different sequential order, and are thus not limited to the sequential order as shown in FIG. 7.

As shown in FIG. 7, at procedure 710, the server computing device 110 receives a plurality of messages from the computing devices 120. As discussed above, each message may correspond to an activity occurred at the computing devices 120. At procedure 720, the server computing device 110 analyzes the messages and generates usage patterns of the computing devices 120. Then, at procedure 730, the server computing device 110 generates automatic power control schedules for the computing devices 120 based on the usage patterns of the computing devices 120. Once the automatic power control schedules are obtained, at procedure 740, the server computing device 110 may control power of each of the computing devices 120 based on the automatic power control schedules. Further, at procedure 750, the server computing device 110 may monitor unusual activities occurred at the computing devices 120 based on the messages and the usage patterns of the computing devices 120.

In certain embodiments, the power management module 134 may monitor the unusual activities occurred at the computing devices by receiving a message from a designated computing device 120, and comparing the message with the usage pattern of the designated computing device 120 to determine whether an activity corresponding to the message is within the usage pattern of the designated computing device 120. If the power management module 134 determines that the activity corresponding to the message is not within the usage pattern of the designated computing device 120, the power management module 134 may then determine an unusual activity to occur at the designated computing device 120. For example, using the example as shown in FIG. 4, if the usage pattern for a designated computing device 120 shows that the user generally do not have access to the computing device 120 between 6 p.m. to 8 a.m., and the power management module 134 monitors a power on message at 3 a.m., the power management module 134 may determine that such activity is not within the usage pattern of the designated computing device 120, and determine that an unusual activity occurs at the designated computing device 120.

In a further aspect, the present disclosure is related to a non-transitory computer readable medium storing computer executable code. The code, when executed at a processor of a controller, may perform the method as described above. In certain embodiments, the non-transitory computer readable medium may include, but not limited to, any physical or virtual storage media storing the firmware of the controller. In certain embodiments, the non-transitory computer readable medium may be implemented as the storage device 116 of the server computing device 110 as shown in FIG. 2.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:
1. A system, comprising:
a server computing device, comprising a processor and a storage device storing computer executable code; and
a plurality of computing devices each functioning as a thin client and communicatively connected to the server computing device;
wherein the computer executable code, when executed at the processor, is configured to:
receive a plurality of messages from the computing devices, wherein each of the messages corresponds to one of a plurality of activities occurred at the computing devices;

analyze the messages and generate usage patterns of the computing devices;

generate automatic power control schedules for the computing devices based on the usage patterns of the computing devices, and control power of each of the computing devices based on the automatic power control schedules; and monitor unusual activities occurred at the computing devices based on the messages and the usage patterns of the computing devices, wherein the computer executable code is configured to control power of each of the computing devices by:

determining, based on the usage patterns of the computing devices, a first number A of the computing devices, wherein the first number A represents a regular number of the computing devices being typically used at a certain time period;

determining a second number N of the computing devices based on the first number A and a power saving rule for optimized power saving and efficiency of the system; and controlling (A+N) of the computing devices to power on at a predetermined power-on time, such that the (A+N) of the computing devices are powered on at the certain time period.

2. The system of claim 1, wherein the activities occurred at the computing devices comprise:
power control actions of the computing devices;
log-in and log-off actions of the computing devices;
active status and time of each of the computing devices;
idle status and time of each of the computing devices;
user presence activities at each of the computing devices; and
administrator defined settings related to the computing devices.

3. The system of claim 2, wherein the power control actions of the computing devices comprise:
manual power on and power off actions operated by users at the computing devices;
administrative power on and power off actions to the computing devices; and
automatic power on and power off actions of each of the computing devices controlled by the computer executable code based on the automatic power control schedules.

4. The system of claim 2, further comprising:
a plurality of motion sensors communicatively connected to the computing devices, configured to detect the user presence activities at each of the computing devices and generate corresponding motion sensor signals,
wherein the messages comprise the motion sensor signals generated by the motion sensors in detection of the user presence activities at each of the computing devices.

5. The system of claim 1, wherein the computer executable code is configured to control power of each of the computing devices by:
controlling the computing devices to power on at the predetermined power-on time;
controlling the computing devices to power off at a predetermined power-off time;
in response to detecting the unusual activities occurring at a specific computing device of the computing devices, locking the specific computing device; and
controlling the computing devices to power on and power off at a scheduled maintenance time.

6. The system of claim 1, wherein the usage patterns of the computing devices comprise:

a plurality of individual usage patterns, each corresponding to one of the computing devices; and
at least one group usage pattern corresponding to a group of the computing devices.

7. The system of claim 6, wherein the group of the computing devices comprise a prioritized group of the computing devices, wherein the computer executable code is configured to control power of each of the computing devices by:
controlling the computing devices in the prioritized group to power on at a prioritized power-on time and power off at a prioritized power-off time; and
controlling the computing devices not in the prioritized group to power on at a regular power-on time and power off at a regular power-off time;
wherein the prioritized power-on time is prior to the regular power-on time, and the prioritized power-off time is later than the regular power-off time.

8. The system of claim 7, wherein the computing devices in the prioritized group are determined by:
the usage patterns of the computing devices; and
locations of the computing devices.

9. The system of claim 1, wherein the computer executable code is configured to monitor the unusual activities occurred at the computing devices by:
receiving a message from a designated computing device of the computing devices;
comparing the message with the usage pattern of the designated computing device to determine whether an activity corresponding to the message is within the usage pattern of the designated computing device; and
in response to determining that the activity corresponding to the message is not within the usage pattern of the designated computing device, determining a unusual activity to occur at the designated computing device.

10. The system of claim 1, wherein the computer executable code is further configured to:
generate an event log based on the messages received from the computing devices.

11. A method for automatic power control and unusual activity detections for thin client computing devices, comprising:
receiving, by a server computing device, a plurality of messages from a plurality of computing devices, wherein each of the computing devices functions as a thin client to the server computing device, and each of the messages corresponds to one of a plurality of activities occurred at the computing devices;
analyzing, by the server computing device, the messages and generating usage patterns of the computing devices;
generating, by the server computing device, automatic power control schedules for the computing devices based on the usage patterns of the computing devices, and controlling power of each of the computing devices based on the automatic power control schedules; and
monitoring, by the server computing device, unusual activities occurred at the computing devices based on the messages and the usage patterns of the computing devices,
wherein the server computing device is configured to control power of each of the computing devices by:
determining, based on the usage patterns of the computing devices, a first number A of the computing devices, wherein the first number A represents a regular number of the computing devices being typically used at a certain time period;

determining a second number N of the computing devices based on the first number A and a power saving rule for optimized power saving and efficiency of the system; and controlling (A+N) of the computing devices to power on at a predetermined power-on time, such that the (A+N) of the computing devices are powered on at the certain time period.

12. The method of claim 11, wherein the activities occurred at the computing devices comprise:

power control actions of the computing devices;
log-in and log-off actions of the computing devices;
active status and time of each of the computing devices;
idle status and time of each of the computing devices;
user presence activities at each of the computing devices; and
administrator defined settings related to the computing devices, wherein the power control actions of the computing devices comprise:
  manual power on and power off actions operated by users at the computing devices;
  administrative power on and power off actions to the computing devices; and
  automatic power on and power off actions of each of the computing devices controlled by the computer executable code based on the automatic power control schedules.

13. The method of claim 12, further comprising:
detecting, by a plurality of motion sensors the user presence activities at each of the computing devices and generating corresponding motion sensor signals;
wherein the messages received by the server computing device comprise the motion sensor signals generated by the motion sensors in detection of the user presence activities at each of the computing devices.

14. The method of claim 12, wherein the server computing device is configured to control power of each of the computing devices by:
controlling the computing devices to power on at the predetermined power-on time;
controlling the computing devices to power off at a predetermined power-off time;
in response to detecting the unusual activities occurring at a specific computing device of the computing devices, locking the specific computing device; and
controlling the computing devices to power on and power off at a scheduled maintenance time.

15. The method of claim 12, wherein the usage patterns of the computing devices comprise a plurality of individual usage patterns, each corresponding to one of the computing devices, and at least one group usage pattern corresponding to a group of the computing devices.

16. The method of claim 15, wherein the group of the computing devices comprise a prioritized group of the computing devices, wherein the server computing device is configured to control power of each of the computing devices by:

controlling the computing devices in the prioritized group to power on at a prioritized power-on time and power off at a prioritized power-off time; and
controlling the computing devices not in the prioritized group to power on at a regular power-on time and power off at a regular power-off time;
wherein the prioritized power-on time is prior to the regular power-on time, and the prioritized power-off time is later than the regular power-off time, and the computing devices in the prioritized group are determined by the usage patterns of the computing devices and locations of the computing devices.

17. A non-transitory computer readable medium storing computer executable code, wherein the computer executable code, when executed at a processor of a server computing device of a client-server system, is configured to:
receive a plurality of messages from a plurality of computing devices, wherein each of the computing devices functions as a thin client, and each of the messages corresponds to one of a plurality of activities occurred at the computing devices;
analyze the messages and generate usage patterns of the computing devices;
generate automatic power control schedules for the computing devices based on the usage patterns of the computing devices, and control power of each of the computing devices based on the automatic power control schedules; and
monitor unusual activities occurred at the computing devices based on the messages and the usage patterns of the computing devices,
wherein the computer executable code is configured to control power of each of the computing devices by:
  determining, based on the usage patterns of the computing devices, a first number A of the computing devices, wherein the first number A represents a regular number of the computing devices being typically used at a certain time period;
  determining a second number N of the computing devices based on the first number A and a power saving rule for optimized power saving and efficiency of the system; and
  controlling (A+N) of the computing devices to power on at a predetermined power-on time, such that the (A+N) of the computing devices are powered on at the certain time period.

18. The non-transitory computer readable medium of claim 17, wherein the computer executable code is configured to control power of each of the computing devices by:
controlling the computing devices to power on at the predetermined power-on time;
controlling the computing devices to power off at a predetermined power-off time;
in response to detecting the unusual activities occurring at a specific computing device of the computing devices, locking the specific computing device; and
controlling the computing devices to power on and power off at a scheduled maintenance time.

* * * * *